US008495235B2

(12) United States Patent
Little et al.

(10) Patent No.: US 8,495,235 B2
(45) Date of Patent: Jul. 23, 2013

(54) SYSTEM AND METHOD FOR MUSIC RESOURCE CONNECTION, SELECTION AND RATING FOR PROVIDING A RADIO LIKE USER LISTENING EXPERIENCE

(75) Inventors: Herbert Anthony Little, Waterloo (CA); Michael Stephen Brown, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 703 days.

(21) Appl. No.: 12/730,892

(22) Filed: Mar. 24, 2010

(65) Prior Publication Data
US 2011/0238779 A1  Sep. 29, 2011

(51) Int. Cl.
G06F 15/16  (2006.01)

(52) U.S. Cl.
USPC .......................................... 709/231; 370/338

(58) Field of Classification Search
USPC .......... 709/203, 217, 219, 231, 227; 370/338; 700/87, 88, 92, 94
See application file for complete search history.

(56) References Cited

U.S. PATENT DOCUMENTS

| 6,933,433 B1* | 8/2005 | Porteus et al. ................. 84/615 |
| 6,934,917 B2* | 8/2005 | Lin ................................. 715/811 |
| 2004/0064476 A1 | 4/2004 | Rounds |
| 2005/0240661 A1 | 10/2005 | Heller et al. |
| 2006/0087926 A1* | 4/2006 | Hwang ........................ 369/30.06 |
| 2006/0195516 A1* | 8/2006 | Beaupre ......................... 709/203 |
| 2006/0243120 A1* | 11/2006 | Takai et al. .................... 84/612 |
| 2008/0125889 A1 | 5/2008 | Atherton et al. |
| 2008/0160910 A1 | 7/2008 | Khedouri et al. |
| 2008/0163746 A1* | 7/2008 | Ueki .............................. 84/626 |
| 2008/0182508 A1 | 7/2008 | Khedouri et al. |
| 2008/0182509 A1 | 7/2008 | Khedouri et al. |
| 2008/0183840 A1 | 7/2008 | Khedouri et al. |
| 2008/0305738 A1 | 12/2008 | Khedouri et al. |
| 2009/0061764 A1 | 3/2009 | Lockhart et al. |
| 2009/0063976 A1 | 3/2009 | Bull et al. |
| 2009/0070184 A1 | 3/2009 | Svendsen |
| 2009/0282020 A1 | 11/2009 | McSheffrey et al. |
| 2011/0143650 A1* | 6/2011 | Robinson ..................... 455/3.02 |

OTHER PUBLICATIONS

Anonymous, "How to Sync Playlists on the iPhone"ehow.com Jun. 12, 2008 , pp. 1-2, XP002592950 Retrieved from the Internet http://web.archive.org/web/EPQ Form 1703 01.9HRI 2008061 2000043/ http://www.ehow.com/how 2214496_syncplaylists-iphone.htm.
Anonymous, Anonymous: "iPod magic (on-the-go playlist in shuffle mode)" May 26, 2009, pp. 1-3, XP002592937 Retrieved from the Internet http://stupidreality.wordpress.com/2007/12/1 71 ipod-magic-on-the-go playlist-in-shuffle-model.

(Continued)

Primary Examiner — Frantz Jean
(74) Attorney, Agent, or Firm — Integral Intellectual Property Inc.; Miriam Paton

(57) ABSTRACT

A novel and useful system and method of automatic resource connection, selection and rating for providing a radio like listening experience to a user. The mechanism is operative to automatically establish a connection from a mobile communications device having media player capability to a music file collection. Playlists maintained on the device are periodically updated with new playlists downloaded to the device. The device generates playlists so as to eventually cycle though the entire contents of a music file collection. Users are given the ability to rate songs by title, artist, album, etc. These ratings are used to calculate scores for each song which are used to bias a random selection process for determining the next song to play. This provides a user with a radio like listening experience.

17 Claims, 10 Drawing Sheets

OTHER PUBLICATIONS

Hackelbusch, Richard Extended European Search Report for EP 10157646.0, Aug. 19, 2010.

Hantschel, Ralf "Uber das Wachstum von Boyer-MooreAutomaten" Universitat Stuttgart May 18, 2007, pp. 1-147, XP007914111 Stuttgart Retrieved from the Internet http://elib/uni-stuttgart.de/opus/volltexte/2007/3149/pdf/DIP 2557.pdf.

Hofferth, Jerrod Using Party Shuffle in iTunes ilounge.com Jun. 16, 2005, pp. 1-8, XP002592938Retrieved from the Internet http://www.ilounge.com/index.php/articles/comments/using-party-shuffle-in-itunesl [retrieved on Jul. 21, 2010].

* cited by examiner

SYSTEM AND METHOD FOR MUSIC RESOURCE CONNECTION, SELECTION AND RATING FOR PROVIDING A RADIO LIKE USER LISTENING EXPERIENCE

TECHNICAL FIELD

The music resource connection mechanism relates to the field of data communications, and more particularly relates to a system and method for automatic resource connection, selection and rating for providing a radio like listening experience to the user.

BACKGROUND

Users of portable audio players typically have large collections of music content stored on local computers, on remote servers and/or on their players. Most content management software tools (e.g., iTunes®, etc.) allows the user to organize their audio collection into playlists for downloading to their portable audio player. Users arrange their music into playlists to create a desired listening experience. To refresh the music on a player, typical music players must be plugged into a local computer host to access music files stored thereon.

Today, many wireless mobile communication devices (smartphones, superphones, etc.) include microprocessors, memory, soundcards, media player hardware and software, Wi-Fi® radio, and run one or more software applications in addition to providing for voice communications. Examples of software applications used in these wireless devices include media players, micro-browsers, address books, email clients, instant messaging (IM) clients, and wavetable instruments. Additionally, wireless devices have access to a plurality of services via the Internet. A wireless device may, for example, be used to browse web sites on the Internet, to transmit and receive graphics, and to execute streaming audio and/or video applications. Such wireless devices may operate on a cellular network, on a wireless local area network (WLAN), or on both of these types of networks.

In a WLAN, an access point is a station that transmits and receives data (sometimes referred to as a transceiver). An access point in an infrastructure BSS (or a client node acting as an AP in an Independent BSS) connects users to other users within the network and also can serve as the point of interconnection between the WLAN and a wired LAN. Each access point can serve multiple users within a defined network area. As users move beyond the range of one access point (i.e., when they roam), they are automatically handed over to the next one. A small WLAN may only require a single access point. The number of access points required increases as a function of the number of network users and the physical size of the network. The access point is typically an IEEE 802.11 (i.e. Wi-Fi) radio receiver/transmitter (or transceiver) and functions as a gateway or bridge between a WLAN and a wired LAN.

BRIEF DESCRIPTION OF THE DRAWINGS

The mechanism is herein described, by way of example only, with reference to the accompanying drawings, wherein.

DETAILED DESCRIPTION

Notation Used Throughout

Figure 1:
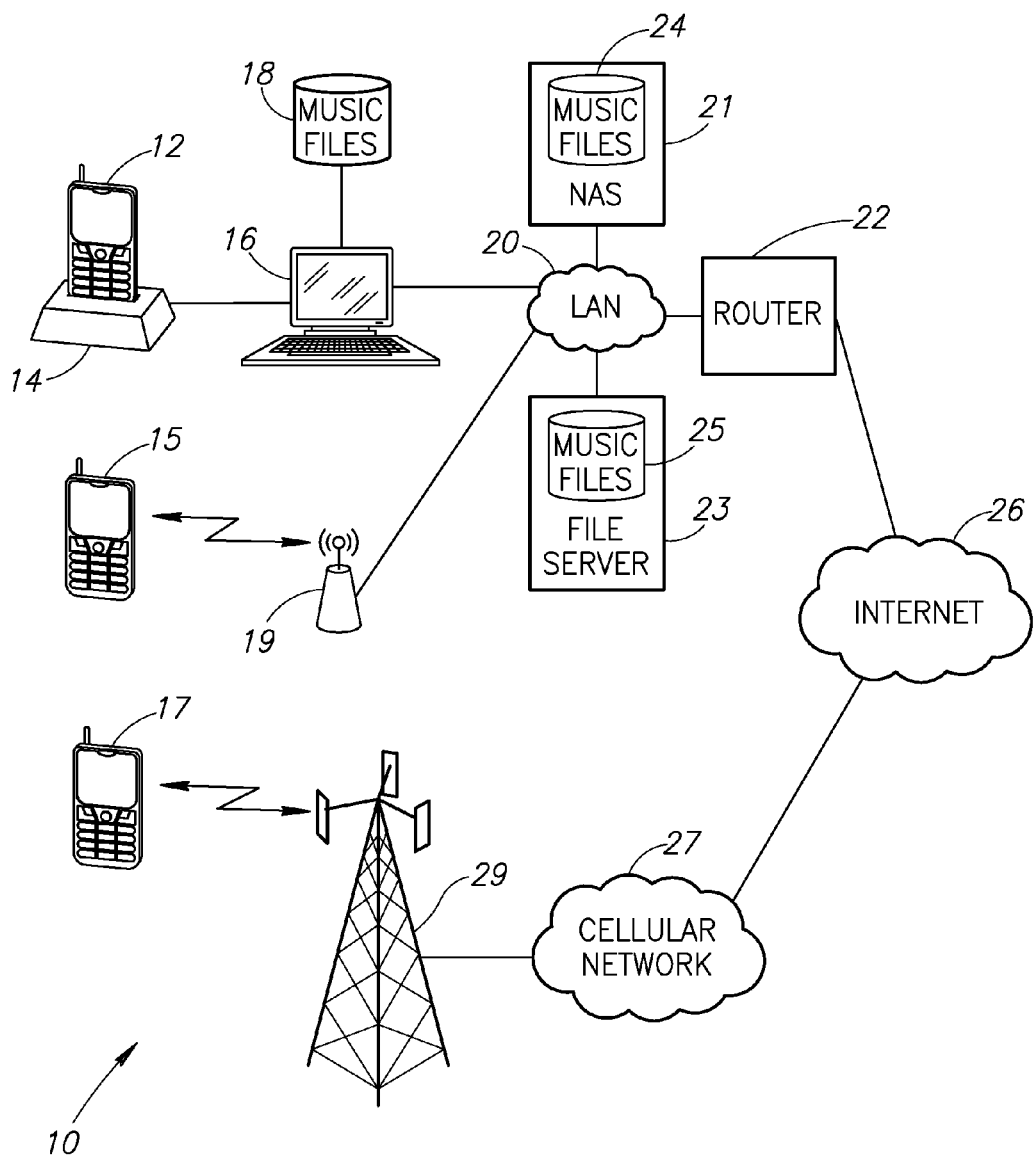
FIG. 1 is a block diagram illustrating both wired and wireless access by a mobile communications device to a music file collection.

The following notation is used throughout this document:

| Term | Definition |
| --- | --- |
| AP | Access Point |
| ARP | Address Resolution Protocol |
| ASIC | Application Specific Integrated Circuit |
| BSS | Basic Service Set |
| BSSID | Basic Service Set ID |
| CDROM | Compact Disc Read Only Memory |
| CPU | Central Processing Unit |
| DHCP | Dynamic Host Control Protocol |
| DNS | Domain Name Server |
| DSP | Digital Signal Processor |
| EDGE | Enhanced Data rates for GSM Evolution |
| EEROM | Electrically Erasable Read Only Memory |
| EPROM | Erasable Programmable Read-Only Memory |
| FM | Frequency Modulation |
| FPGA | Field Programmable Gate Array |
| FTP | File Transfer Protocol |
| GPRS | General packet radio service |
| GPS | Global Positioning System |
| GSM | Global System for Mobile communications |
| HDL | Hardware Description Language |
| HTTP | Hyper-Text Transport Protocol |
| IEEE | Institution of Electrical Engineers |
| IM | Instant Messaging |
| IP | Internet Protocol |
| LAN | Local Area Network |
| MAC | Media Access Control |
| PC | Personal Computer |
| PCI | Peripheral Component Interconnect |
| PDA | Personal digital assistant |
| PNA | Personal Navigation Assistant |
| RAM | Random Access Memory |
| RAT | Radio Access Technology |
| RF | Radio Frequency |
| ROM | Read Only Memory |
| RSSI | Received Signal Strength Indicator |
| RUIM | Re-Usable Identification Module |
| SDIO | Secure Digital Input/Output |
| SIM | Subscriber Identity Module |
| SPI | Serial peripheral interconnect |
| SSID | Service Set Identifier |
| TCP | Transport Control Protocol |
| UI | User Interface |
| URL | Uniform Resource Locator |
| USB | Universal Serial Bus |

-continued

| Term | Definition |
| --- | --- |
| UWB | Ultra-Wideband |
| WAN | Wide Area Network |
| WAP | Wireless Access Point |
| WAP | Wireless Application Protocol |
| WEP | Wired Equivalent Protocol |
| WLAN | Wireless Local Area Network |

DETAILED DESCRIPTION

A novel and useful system and method of automatic connection to a music resource collection, selection and rating mechanism (referred to simply as the music resource connection mechanism) that allows user to have a more radio-like listening experience. The mechanism is operative to automatically establish a connection from a mobile communications device having media player capability to a music file collection. Song sets maintained on the device are periodically updated with new song sets downloaded to the device. Users are given the ability to rate songs by title, artist, album, etc. These ratings are used to calculate scores for each song which are used to bias a random selection process for determining the next song to play, i.e. a playlist. This provides a user with a radio like listening experience. Note that the term "song set" is intended to refer to an unordered collection of songs, as opposed to a "playlist" which refers to an ordered set of songs. Unlike playlists on conventional music players, song ordering in the music resource connection mechanism is determined at playback time and not during the song set download process.

With respect to WLANs, the term "Wi-Fi" or Wireless Fidelity pertains to certain types of WLANs that use specifications in the Institute of Electrical and Electronics Engineers ("IEEE") 802.11 family.

To aid in illustrating the implementations of the music resource connection mechanism, the various implementations described infra are described in the context of an example communication system including a mobile communications device that implements IEEE 802.11-based wireless networking standards. It is appreciated, however, that those of ordinary skill in the art, using the teachings provided herein, can implement the disclosed techniques using other wireless standards and networks without departing from the scope of the mechanism. Accordingly, references to techniques and components specific to IEEE 802.11 apply also to the equivalent techniques or components in other wireless network standards unless otherwise noted.

Note that some aspects of the mechanism described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits implemented in an Application Specific Integrated Circuit (ASIC) or Field Programmable Gate Array (FPGA), or as functionally equivalent discrete hardware components.

As will be appreciated by one skilled in the art, the music resource connection mechanism may be implemented as a system, method, computer program product or any combination thereof. Accordingly, the music resource connection mechanism may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the music resource connection mechanism may take the form of a computer program product implemented in any tangible medium of expression having computer usable program code implemented in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code implemented therewith, either in baseband or as part of a carrier wave. The computer usable program code may be transmitted using any appropriate medium, including but not limited to wireless, wireline, optical fiber cable, RF, etc.

Computer program code for carrying out operations of the music resource connection mechanism may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The music resource connection mechanism is described below with reference to flowchart illustrations and/or block diagrams of methods, apparatus (systems) and computer program products according to implementations thereof. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is noted that computer programs implementing the music resource connection mechanism can be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this mechanism. All these operations are well-known to those skilled in the art of computer systems.

The flowchart and block diagrams in the Figures illustrate the architecture, functionality, and operation of possible implementations of systems, methods and computer program products according to various implementations of the music resource connection mechanism. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Example Network

A block diagram illustrating both wired and wireless access by a mobile communications device to a music file collection is shown in FIG. 1. The example network, generally referenced 10, illustrates several examples of a mobile device connecting to a music file collection. In a first example, the mobile device 12 is docked in a charging cradle 14. The charging cradle provides both charging current to recharge the mobile device batteries as well as providing a connection from the mobile device to the local computer 16.

The music file collection may be stored using several options. In one implementation, the music file collection 18 is stored directly on the local computer or on an attached external hard drive. In a second implementation, the music file collection 24 is stored on a network attached storage (NAS) device 21 in communication with the local computer host 16 via a network, e.g., LAN 20. In a third implementation, the music file collection 25 is stored on a file server 23 in communication with the local computer host 16 via a network, e.g., LAN 20. Router 22 provides a gateway to the Internet 26 for the LAN 20.

When the mobile device is docked in the charging cradle 14, the music resource connection mechanism is operative to select a new playlist, download it to the mobile device thus refreshing the music stored thereon. A selection and rating method, described in more detail infra, provides the user with the ability to create a radio like listening experience.

In a second example, the mobile device 15 connects to a music file collection via a WLAN connection. Mobile device 15 establishes a connection to the access point 19 which is connected to LAN 20. Thus, mobile device 15 is able to access any music file collection available over the LAN 20, e.g., music file collection 18, 24, 25.

The IEEE 802.11 standard defines several services that govern how two IEEE 802.11 devices communicate. In current Wi-Fi technology, Wi-Fi profiles play a vital role in WLAN connectivity. A profile is identified by a unique identifier, Service Set Identifier (SSID). It also specifies the frequency band of operation, data rates, transmit power levels and security methods used for authentication and encryption and the corresponding credentials. A user can specify multiple profiles on his device that could be geographically collocated or they could map to Wi-Fi networks installed in different areas (e.g., home vs. office, etc).

Today, many mobile communications devices are equipped not only with the primary cellular air interface but with Wi-Fi radios as well, e.g., dual-band mobile smart phones that feature both cellular and Wi-Fi air interfaces). Such multi-radio devices must perform a scan in order to discover the neighboring Access Points (APs) to which the handset can associate/connect. An AP must match one of the profiles stored on the device (either created by the user or pushed by an IT policy) for the device to associate with.

In a WLAN network, a service set identifier (SSID) identifies a particular IEEE 802.11 wireless LAN. A client device receives broadcast messages from all access points within range advertising their SSIDs. The client device can then either manually or automatically select the network with which to associate. It is legitimate for multiple access points to share the same SSID if they provide access to the same network as part of an extended service set.

The basic service set (BSS) is the basic building block of an IEEE 802.11 wireless LAN. In infrastructure mode one access point (AP) together with all associated stations (STAs) is called a BSS. An AP acts as a master to control the stations within that BSS. Each BSS is identified by a Basic Service Set Identifier (BSSID). The most basic BSS is two STAs in Independent mode. In infrastructure mode, a basic BSS consists of one AP and one STA. The BSSID uniquely identifies each BSS (the SSID however, can be used in multiple, possibly overlapping, BSSs). In an infrastructure BSS, the BSSID is the MAC address of the wireless access point (WAP).

When a station wants to access an existing BSS (such as after power-up, sleep mode or just entering a BSS area), the station must get synchronization information from the Access Point. The station obtains this information by either (1) passive scanning whereby the station waits to receive a Beacon frame (and/or Probe Responses sent in response to other stations' Probe Requests) from the Access Point; or (2) active scanning whereby the station attempts to find an Access Point by transmitting Probe Request frames and waiting for a Probe Response from the Access Point. Note that the Beacon frame is a periodic frame sent by the Access Point containing synchronization information.

Once the station has found an Access Point, in order to join the BSS, it must perform the Authentication Process which involves the exchange of information between the Access Point and the station, where each side shows knowledge of a shared credential(s).

Once authenticated, the station begins the Association Process which involves the exchange of information about the station and BSS capabilities. Only after the association process is complete, is the station permitted to transmit and receive data frames with the Access Point.

In implementing the WLAN protocol, communications devices often utilize so called WLAN profiles to aid in establishing connections between stations and access points. A wireless local area network profile defines the parameters for the connection between the station and Wi-Fi networks including access points. Profiles typically include connection related information including, for example, SSID, connection type (i.e., open or shared key), security, authentication, encryption, WEP shared keys, key length, frequency bands, roaming enable/disable, SSID broadcasted, etc.

In one example implementation, the mobile device automatically (i.e. without user intervention or initiation other than initial configuration) establishes a connection to a particular music file collection via the WLAN connection. Once a WLAN connection is established, an updated playlist is generated and the corresponding music files are downloaded to the mobile device thus refreshing the music stored thereon. A selection and rating method, described in more detail infra, provides the user with the ability to create a radio like listening experience.

In a third example, the mobile device 17 connects to a music file collection via a cellular connection. Mobile device 17, via the cellular connection with the base station 21, establishes a connection through the cellular network 27 and the Internet 26 to the router 22 which is connected to LAN 20. In this manner, mobile device 17 is able to access any music file collection available over the LAN 20, e.g., music file collection 18, 24, 25.

Thus, via the cellular connection, the mobile device 17 automatically (i.e. without user intervention or initiation other than initial configuration) establishes a connection to a particular music file collection. Once a connection to the music file collection is established, an updated playlist is generated and the corresponding music files are downloaded to the mobile device thus refreshing the music stored thereon. A selection and rating method, described in more detail infra, provides the user with the ability to create a radio like listening experience.

Mobile Communications Device Implementation

Figure 2:
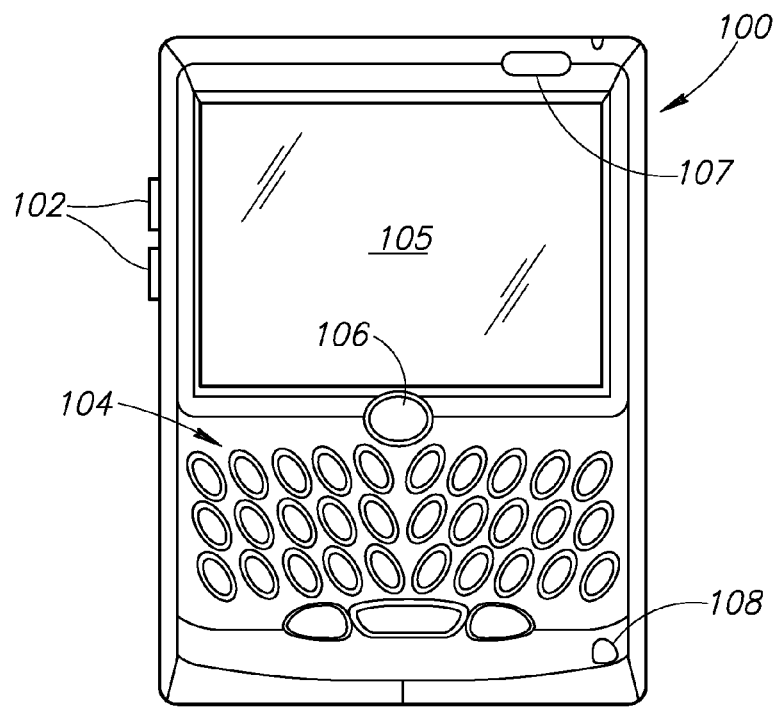
FIG. 2 is a front view of an example mobile electronic device incorporating the music resource connection mechanism.

A front view of an example mobile electronic device incorporating the music resource connection mechanism is shown in FIG. 2. The example electronic device is generally referenced 100. A non-exhaustive list of examples for the electronic device includes a personal digital assistant (PDA), a mobile phone, a smartphone, superphone, a handheld gaming device, a handheld media player, an electronic mail client, an instant messaging client, a netbook computer, a notebook computer, a laptop computer, a desktop computer and the like.

Electronic device 100 may be one device enclosed in one enclosure. Electronic device 100, however, may represent a "system", in which different components are connected together to form the system. As an example, a desktop computer may be such a system, having a flat panel display provided by one vendor and a camera provided by another vendor.

The device 100 comprises a display module 105 and various user input components including, for example, a keyboard 104, a trackball 106, buttons 102 and a microphone 108. If display module 105 comprises a touchscreen then display module 105 is also a user input component. Other user input components are also contemplated. Various user output components of mobile electronic device 100 are shown, including, for example, a speaker 107. Other user output components are also contemplated.

Figure 3:
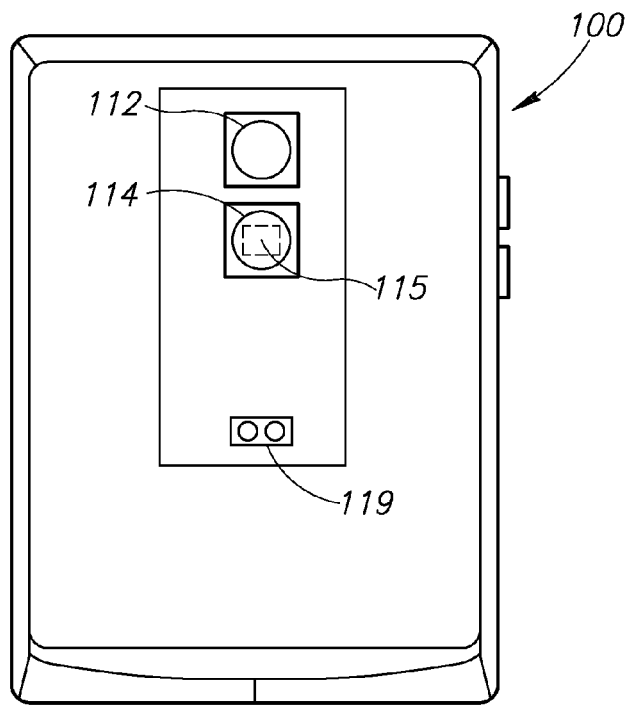
FIG. 3 is a rear view of the example mobile electronic device illustrated in FIG. 2.

A rear view of the example mobile electronic device illustrated in FIG. 2 is shown in FIG. 3. A flash 112, lens 114, image sensor 115 and one or more other sensors 119. Lens 114 may include one or more optical elements. Image sensor 115 is located inside the camera 100 behind lens 114. Optical elements of lens 114 may optionally be movable by a mechanical control element (not shown) of device 100, for example, for the purpose of implementing autofocus functionality. When the digital camera functionality is operated, light focused by lens 114 onto image sensor 115 results in the capture of an image by image sensor 114, and a preview image related to the captured image is displayed by display module 105. Mobile electronic device 100 may optionally include one or more sensors 119.

Figure 4:
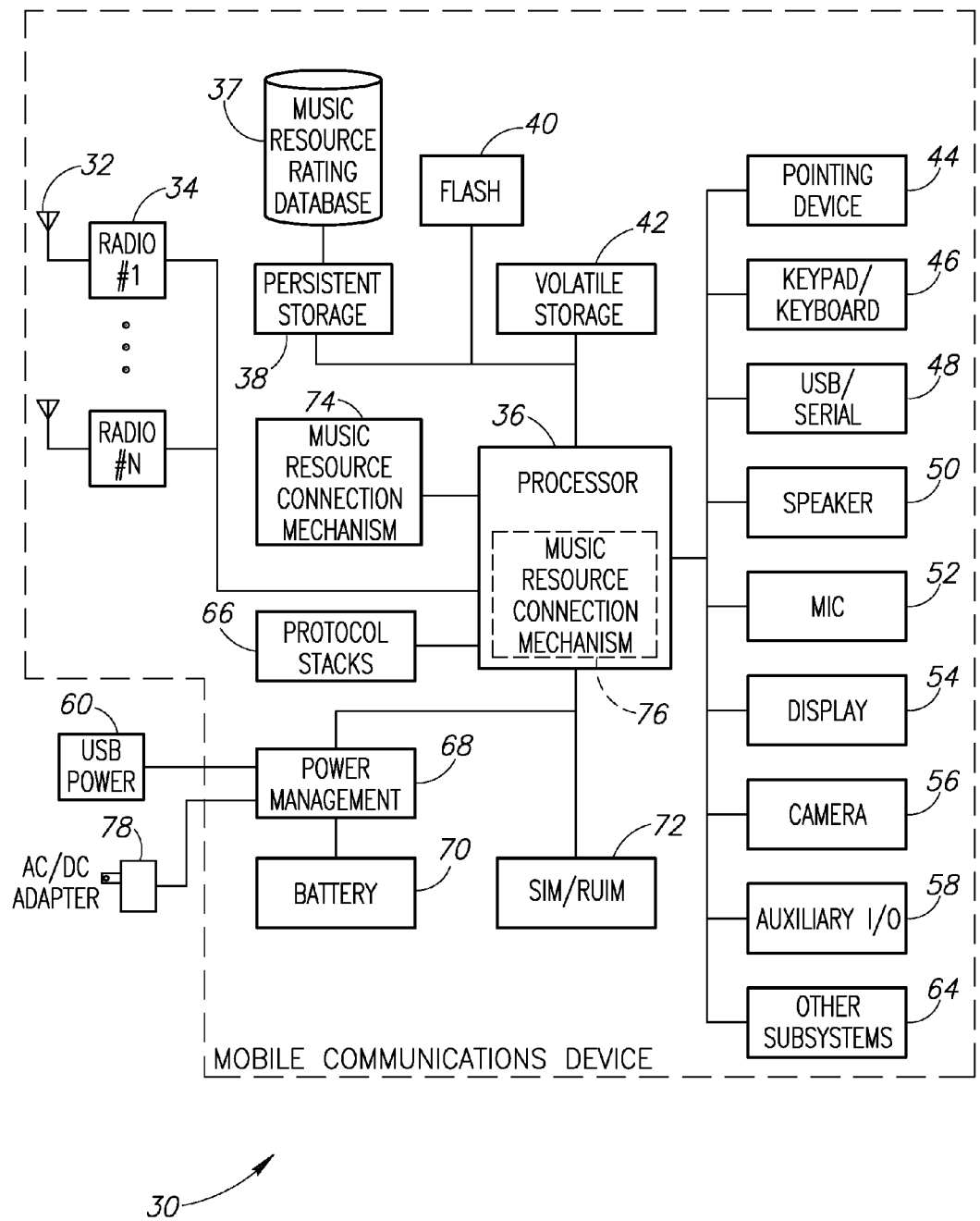
FIG. 4 is a block diagram illustrating an example wireless communication device incorporating the music resource connection mechanism.

A block diagram illustrating an example mobile communication device incorporating the music resource connection mechanism is shown in FIG. 4. The mobile communication device is preferably a two-way communication device having voice and data communication capabilities. In addition, the device optionally has the capability to communicate with other computer systems via the Internet. Note that the mobile communications device (or mobile device) may comprise any suitable wired or wireless device such as multimedia player, mobile communication device, cellular phone, smartphone, PDA, PNA, Bluetooth device, etc. For illustration purposes only, the device is shown as a mobile device, such as a cellular based smartphone or superphone. Note that this example is not intended to limit the scope of the mechanism as the music resource connection mechanism can be implemented in a wide variety of communication devices. It is further appreciated the mobile device 30 shown is intentionally simplified to illustrate only certain components, as the mobile device may comprise other components and subsystems 64 beyond those shown.

The mobile device, generally referenced 30, comprises a processor 36 which may comprise a baseband processor, CPU, microprocessor, DSP, etc., optionally having both analog and digital portions. The mobile device may comprise a plurality of radios 34 and associated antennas 32. Radios for the basic cellular link and any number of other wireless standards and Radio Access Technologies (RATs) may be included. Examples include, but are not limited to, Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc. The mobile device also comprises protocol stacks 66, which may or may not be entirely or partially implemented in the processor 36. The protocol stacks implemented will depend on the particular wireless protocols required.

The mobile device may also comprise internal volatile storage 42 (e.g., RAM) and persistence storage 38 (e.g., ROM) and flash memory 40. Persistent storage 38 also stores applications executable by processor 36 including the related data files used by those applications to allow device 30 to perform its intended functions. Several user-interface devices include trackball/thumbwheel 44 which may comprise a depressible thumbwheel/trackball that is used for navigation, selection of menu choices and confirmation of action, keypad/keyboard 46 such as arranged in QWERTY fashion for entering alphanumeric data and a numeric keypad for entering dialing digits and for other controls and inputs (the keyboard may also contain symbol, function and command keys such as a phone send/end key, a menu key and an escape key), microphone(s) 52, speaker(s) 50 and associated audio codec or other multimedia codecs, vibrator (not shown) for alerting a user, camera and related circuitry 56, display(s) 54 and associated display controller. A serial/USB or other interface connection 48 (e.g., SPI, SDIO, PCI, USD, etc.) provides a serial link to a user's PC or other device. SIM/RUIM card 72 provides the interface to a user's SIM or RUIM card for storing user data such as address book entries, user identification, etc.

Portable power is provided by the battery 70 coupled to power management circuitry 68. External power is provided via USB power 60 or an AC/DC adapter 78 connected to the power management circuitry 68 which is operative to manage the charging and discharging of the battery 70.

The mobile communications device is also adapted to implement the music resource connection mechanism either as a task 74 stored in external memory executed by the processor 36 or implemented as a task 76 executed from memory embedded in processor 36. Task blocks 74, 76 are adapted to implement the music resource connection mechanism described in more detail infra. The music resource rating database 37, as utilized by the music resource connection mechanism may be implemented in volatile storage 42 or other suitable memory. Note that the music resource connection mechanism may be implemented as hardware, software or as a combination of hardware and software. Implemented as a software task, the program code operative to implement the music resource connection mechanism is stored in one or more memories 38, 40, 42 or local memories within the processor 36.

Music Resource Connection Mechanism

Figure 5:
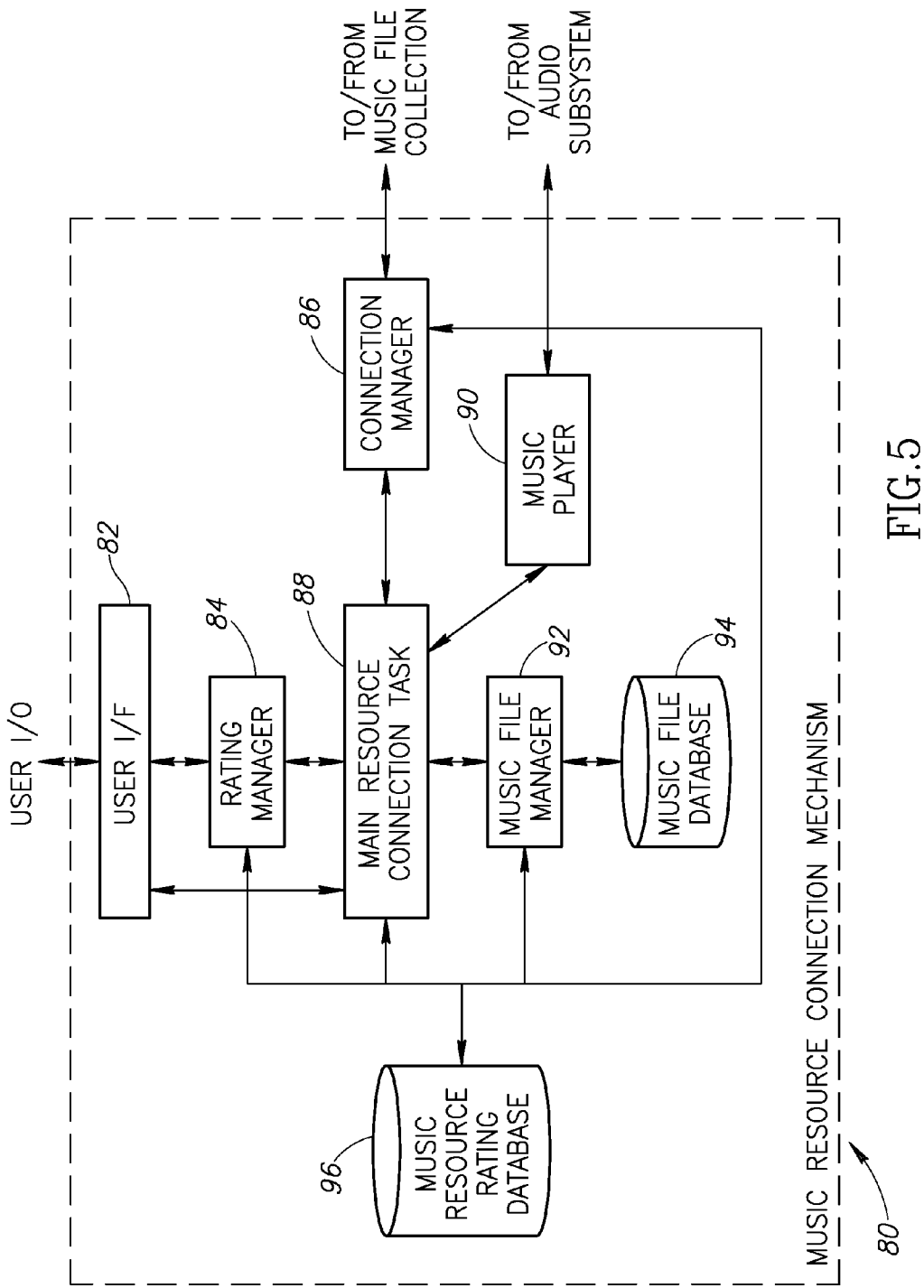
FIG. 5 is a block diagram illustrating the functional blocks of the music resource connection mechanism in more detail.

A block diagram illustrating the functional blocks of the music resource connection mechanism in more detail is shown in FIG. 5. The example mechanism, generally referenced 80, comprises a main resource connection task 88, playlist manager 92, current playlist database 94, connection manager 86, music player subsystem 90, rating manager 84, user interface (I/F) 82 and music resource rating database 96.

In operation, using the mechanism as implemented in a mobile communications device, a user is able to obtain a radio like listening experience. In other words, songs retrieved from the user's music files collection are played continuously, without user input, and without the user having to manually create playlists ahead-of-time. The mechanism occasionally and automatically establishes a connection from the mobile communications device to the music files collection and, using a random selection process, downloads a new set of music files (i.e. a song set) that can be incorporated into the playback process in order to present a variety of music files to the user. In one implementation, user input at playback time, in the form of ratings applied to songs, artists, albums, genres, etc., may be incorporated into the music file download and playback algorithms so the user will tend to hear the music that they enjoy most. At no time, however, does the user need to be directly involved in the playlist creation process.

When it detects the conditions for a connection to take place, Main Task 88 instructs the Connection Manager 86 to establish a connection to the music files collection and select a set of music files to download. The Connection Manager retrieves metadata about all of the songs in the music files collection, and uses that metadata during the song selection process. In one implementation, Connection Manager 86 may select a random set of songs from the music files collection. In another implementation, Connection Manager 86 may consult Rating Database 96 during the song selection process. Main Task 88 stores the downloaded music files in Music File Database 94. When the user interacts with User I/F 82 to initiate playback of a song, Main Task 88 requests the next music file from Music File Manager 92. In one implementation, Music File Manager 92 may select a song from Music File Database 94 at random. In another implementation, Music File Manager 92 may consult Rating Database 96 during the song selection process. In another implementation, Music File manager 92 may attempt to avoid selecting a song that has been previously played within a certain period of time in an attempt to avoid frequent song repetition. Main Task 88 then uses Music Player 90 to initiate playback of the selected song. In one implementation, during playback, the user may interact with User I/F 82 to record ratings pertaining to the current song, such as the track, artist, album, genre, etc. These ratings are provided to Rating Manager 84 which stores them in Rating Database 96.

Figure 6:
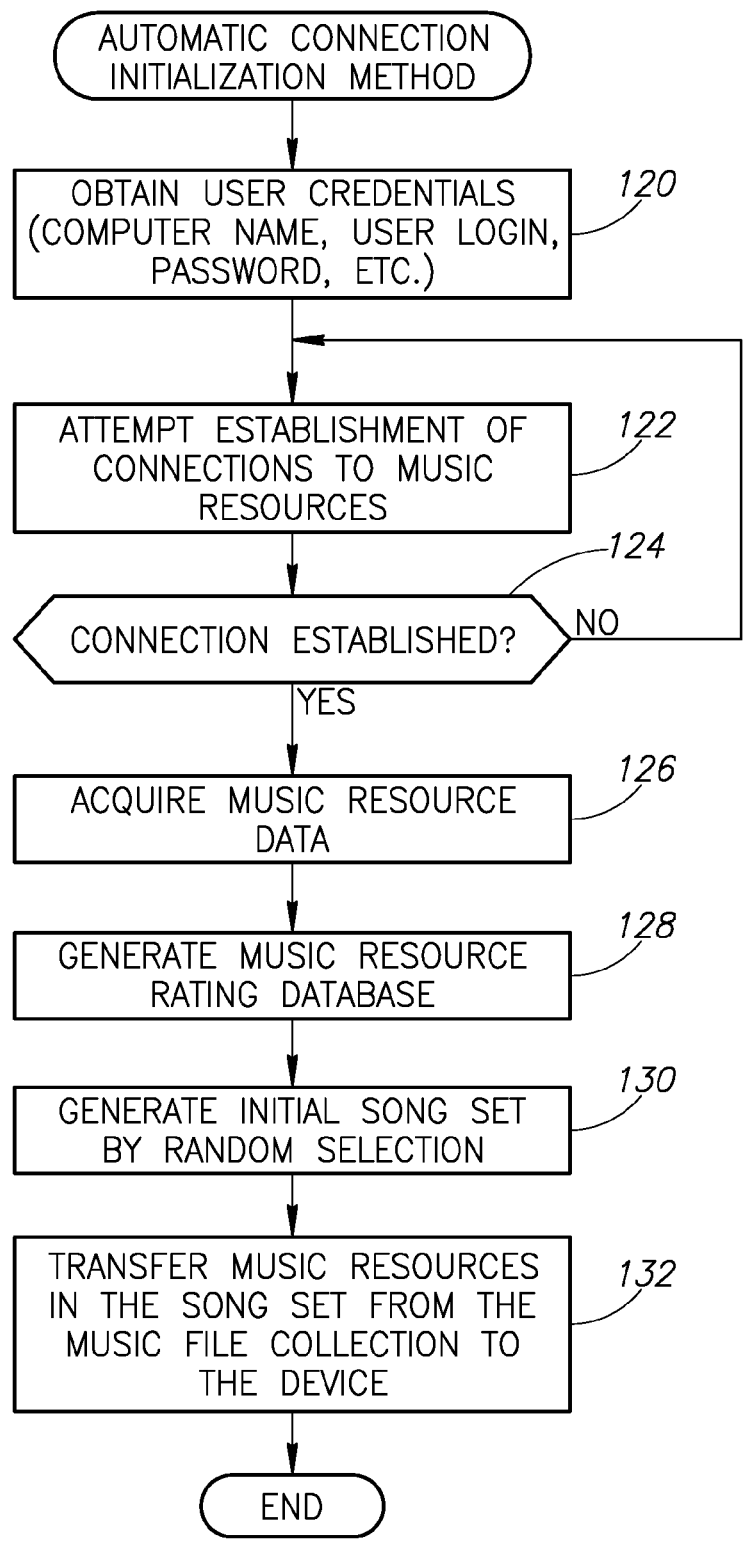
FIG. 6 is a flow diagram illustrating an example music resource connection initialization method.

A flow diagram illustrating an example music resource connection initialization method is shown in FIG. 6. In this initialization method, the mobile communications device establishes a connection to the music file collection, acquires data from the collection and prepares the rating database and initial song set. The process may be triggered manually by the user when the user perceives that a successful connection to the music files connection may be possible. First, user credentials are obtained from the user (step 120). User credentials include any information related to connecting to and acquiring data from the music files collection, for example, computer name, user login, password, etc. The device then attempts to establish a connection to the music file collection (step 122). It is noted that the manner in which the device connects to the music file collection is not critical to operation of the technology described herein. As described infra in connection with FIG. 1, the device can connect, for example, via charging cradle (docking station), WLAN connection or cellular connection. The user may manually instruct the device to use one or more connection type(s).

If no connection can be established (step 124), further attempts are made (step 122) either until a timeout or other stopping criterion or until a connection is successfully established. The connection attempts may or may not all use the same type of connection. For example, if a first attempt to connect via a charging cradle fails, the device may then attempt a connection via WLAN. Once the connection is established, the device acquires the music resource data contained in the music file collection (step 126). This may include music file metadata such as title, artist, album, genre, etc. The data is downloaded to the device and the music resource rating database is generated therefrom (step 128). The database is used during operation to store user rating information and other related data for use in generating playlists to refresh the device with.

An initial song set is then generated using a random selection process (step 130). In one implementation, the song set is generated by taking into account one or more parameters stored in the records of the music resource rating database or other user supplied parameters. Once the initial song set is generated, the corresponding music files are downloaded from the music file collection to the device (step 132).

Figure 7:
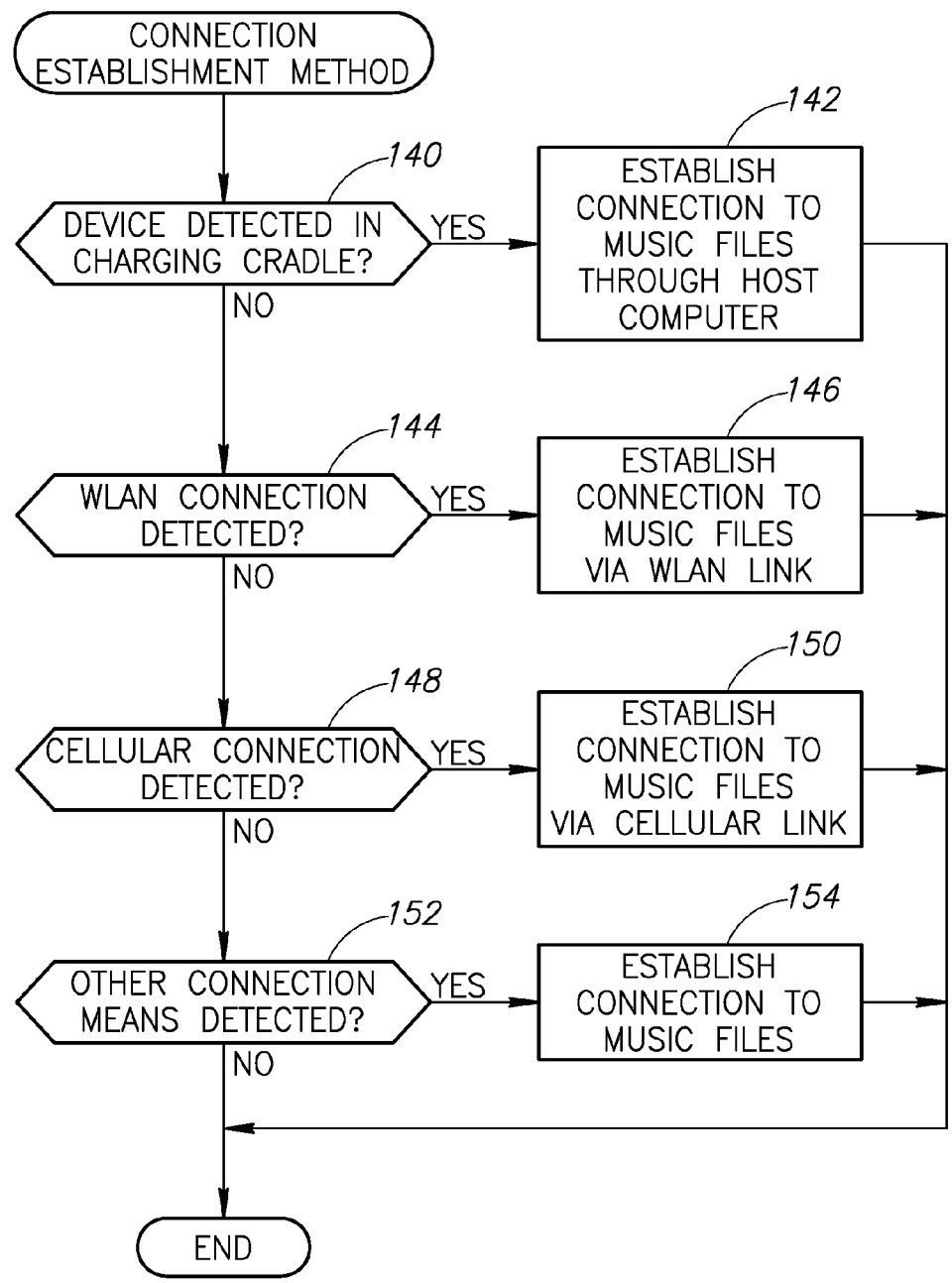
FIG. 7 is a flow diagram illustrating an example connection establishment method.

A flow diagram illustrating an example connection establishment method is shown in FIG. 7. Once configured and initialized (via the method of FIG. 6), the device automatically establishes a connection to the music file collection when possible to refresh the song set on the device, without any user intervention. The device periodically checks whether it is connected to the charging cradle (step 140). If placement in the charging cradle is detected, a connection to the music file collection through the local host computer is established (step 142). If it is detected that the device is within range of a WLAN (step 144), the device attempts to establish a connection to the music file collection via the WLAN (step 146). The device may choose to attempt a WLAN connection only if it is within range of a particular WLAN through which a successful connection was established during the initialization method above, in order to avoid the cost associated with attempting a connection through other WLANs. If it is detected that the device has access via the cellular link, (step 148), the device attempts to establish a connection to the music file collection via the cellular link (step 150). As the mechanism is not limited to the above methods of establishing a connection, if any other connection means are detected (step 152), a connection to the music file collection is established thereby (step 154). Note that the device may not attempt all of these connection types, based on the configuration parameters established in the initialization process. For example, if that process established a connection via the charging cradle, the device may only attempt step 140 and not attempt the others.

Figure 8:
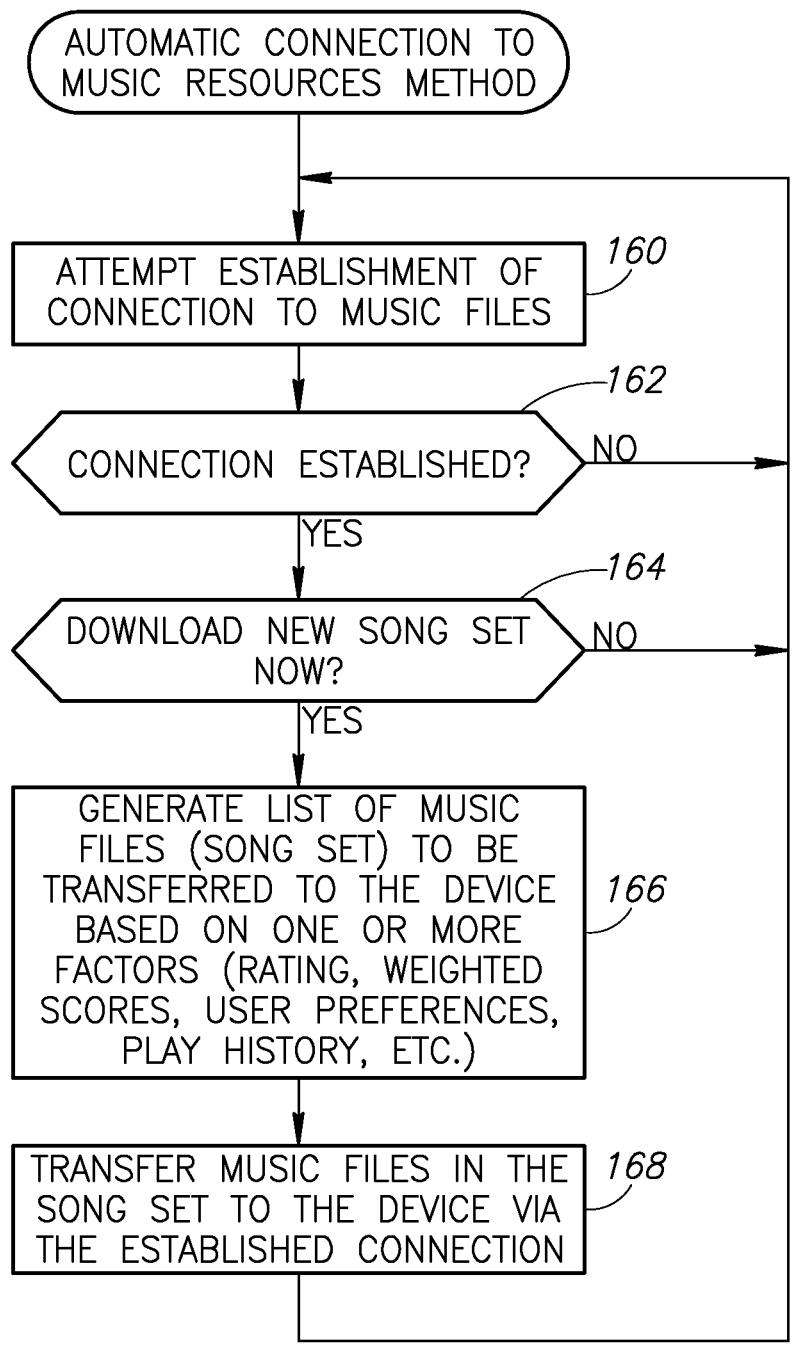
FIG. 8 is a flow diagram illustrating an example method of automatically connecting to music resources.

A flow diagram illustrating an example method of automatically connecting to music resources is shown in FIG. 8. This method is performed periodically by the device. First, the device attempts to connect to the music file collection using any suitable method (e.g., via docking station, WLAN, cellular, etc.) (step 160). If a connection is established (step 162), it is checked whether the device should download a new song set at that time (step 164). In one implementation, the user configures the device to download a new song set at any desired frequency (e.g., once per day, once every other day, once per week, etc.).

Once it is determined that a new song set should be downloaded (step 164), the device generates a list of music files (i.e. song set) to be transferred to the device based on one or more selection factors (step 166). In one implementation, the factors may include any parameter or data item that is pertinent to the determination of the song set, for example, ratings, weighted scores, user preferences, play history, etc. Ratings may be based on title, artist, album, genre, etc. Higher rated songs will be played more frequently. Weighted scores are calculated based on any number of criteria obtained from the records of the music resource rating database. Play history takes into account what songs the user listened to repeatedly, giving them more weight, what songs the user skipped, giving them less weight, etc.

In one implementation, the device generates a list of candidate songs (i.e. a subset of the song database) available for song set selection. The song set is generated by randomly selecting from among the songs in the candidate list. In another implementation, the device selects the song set contents randomly from the contents of the entire database while taking into account the one or more selection factors. In yet another implementation, a song selection algorithm similar to that of FIG. 11 (described in more detail infra) is used to determine the songs to be included in the song set.

Once the song set is generated, the songs contained therein are downloaded (i.e. transferred) to the device over the established connection (step 168). Note that to minimize the time and resource requirements of the download process, the device (1) frees up space by deleting songs from the device database that are not in the new song set, and (2) only downloads songs in the new song set that are not currently in the device database. Once the song set is downloaded, the user can then interact with the user interface to initiate playback of the songs contained in the song set. When the mechanism needs to select a new song to play it may use a number of different criteria during the selection process, e.g, when playback is first initiated, when playback of the current song completes, if the user chooses to skip the current song-, etc. In one implementation, the mechanism provides the user a way to provide feedback (e.g., ratings) which is taken into account in the song selection process. This feedback mechanism will now be described in more detail.

Figure 9:
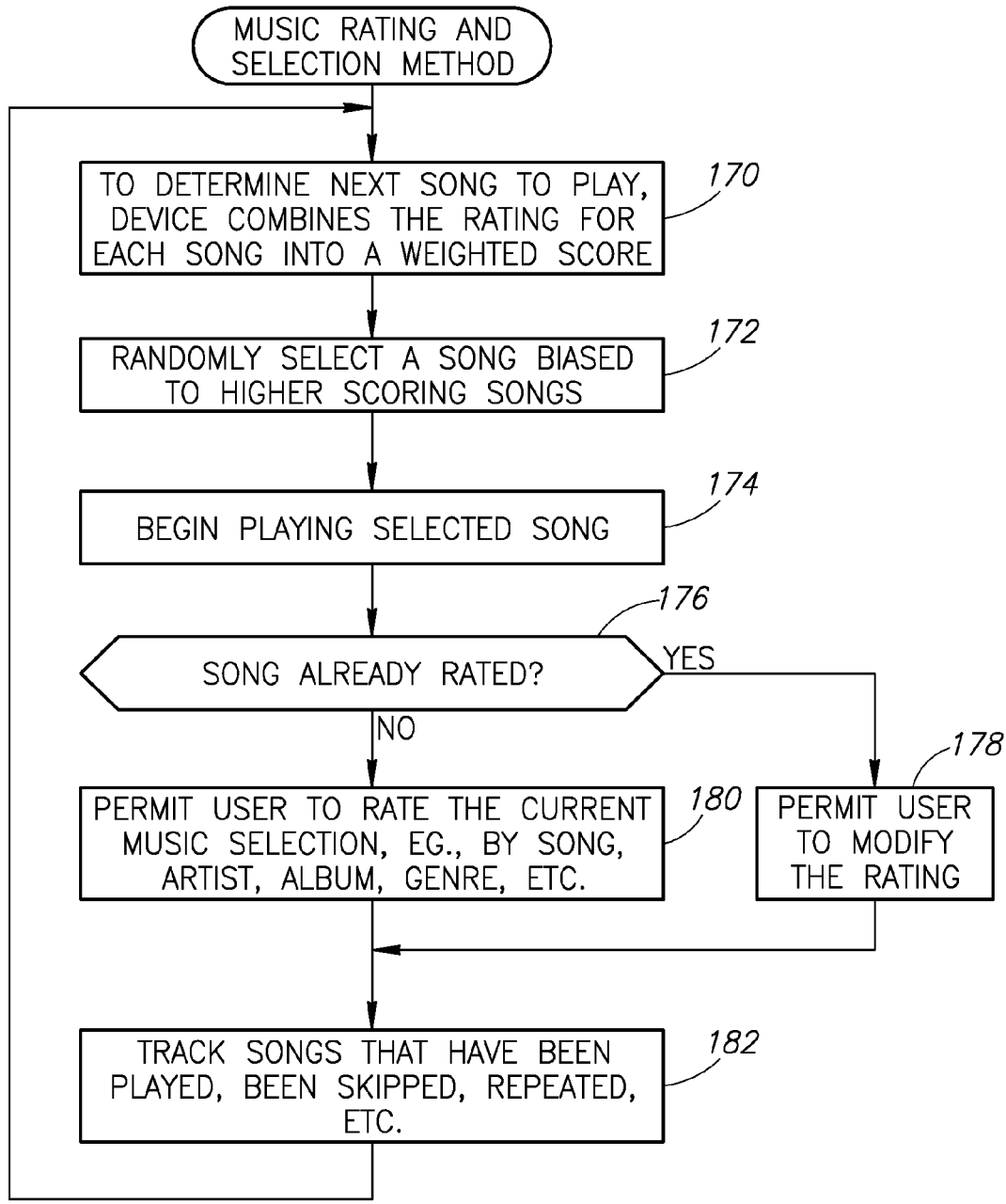
FIG. 9 is a flow diagram illustrating an example music rating and selection method.

A flow diagram illustrating an example music rating and selection method is shown in FIG. 9. To determine the next song to play from the downloaded song set, the device combines any existing ratings for each song into a weighted score (step 170). A song is then selected randomly biased to higher scoring songs (step 172) using a process described in more detail below. The selected song is then played (step 174).

While the song is playing, it is determined whether the song has already been rated (i.e. feedback has already been provided) (step 176). If so, the user is given an opportunity to modify her/his rating(s) for that song (step 178). If the song has not been rated (step 176), the user is given an opportunity to rate the current song selection in one or more categories (e.g., by title, artist, album, genre, etc.) (step 180). Note that in an alternative implementation, the user is not required to rate every song, but may choose to do so if it is convenient. Additional information is collected by tracking the songs that have played, been skipped, repeated, etc. (step 182). This information can also be used in determining the next song to play using the ratings for a song.

Figure 10:
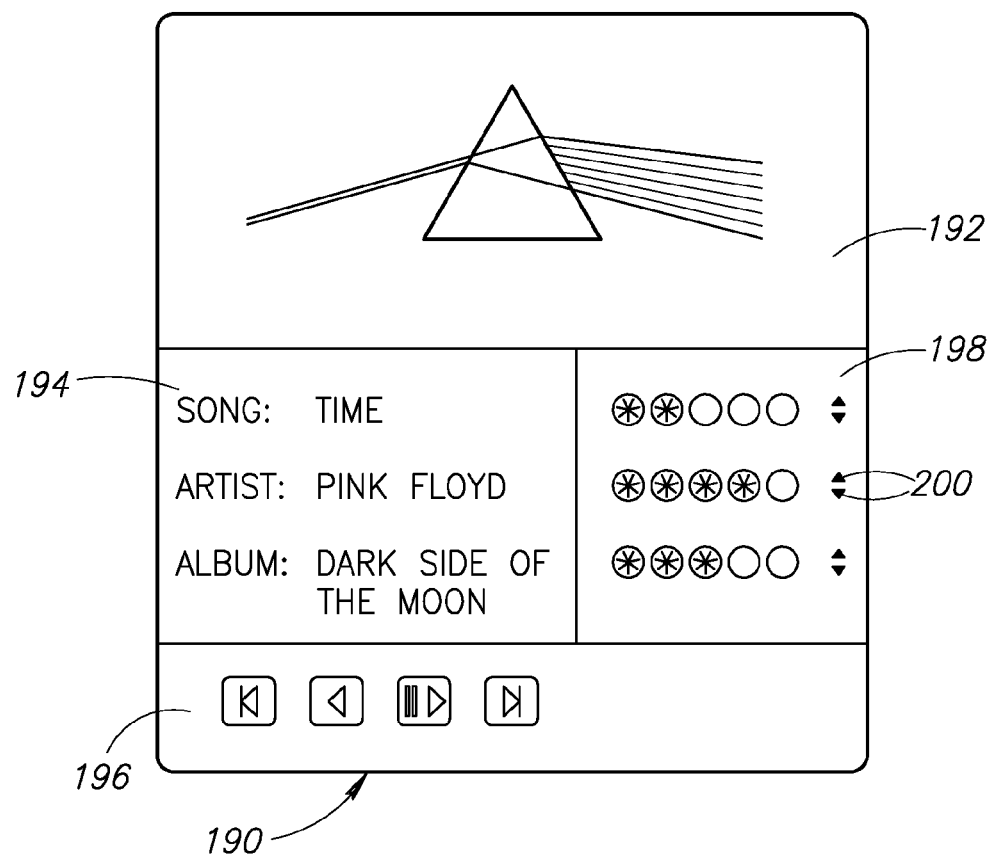
FIG. 10 is a diagram illustrating an example user interface screen display showing song information and user rating input.

A diagram illustrating an example user interface screen display showing song information and user rating input is shown in FIG. 10. The example screen display, generally referenced 190, comprises song navigation buttons 196, e.g., rewind, fast forward, play, etc., album cover art area 192 and song metadata 194 including, for example, title, artist, album. In addition, the display 190 comprises a rating area 198 which gives the user a way to provide feedback on a song. In this example implementation, each item (i.e. title, artist, etc.) has a corresponding rating field containing six potential values represented by a number of stars between zero and five. Users rate each item by setting the number of stars using up/down buttons 200. If an item has previously been rated, the current rating is displayed and the user has an opportunity to modify the rating by increasing or decreasing the number of stars. In one implementation, an item that has not previously been rated may be given a default rating of three stars, for example.

In alternative implementations, other methods of visually presenting existing ratings and allowing users to select or modify ratings are possible including, but not limited to, rating fields that present a different number of potential values (e.g., up to ten stars, a percentage field, "thumbs up" versus "thumbs down", etc). The rating information is entered into the music resource rating database for subsequent use in generating playlists. In addition, the outcome of each song that plays is tracked and recorded in the music resource rating database as well. Possible outcomes for a song include, for example, whether the song was played in its entirety, was skipped altogether, was played partially and then skipped, etc. It is appreciated that other possible outcomes for a song are contemplated and may be used depending on the particular implementation of the technology described herein.

Based on song ratings and song outcomes, the device assigns a total weighted score to each song stored on the device. In one implementation, the individual ratings for the title, album, and artist are converted to integer values between 0 and 5 (corresponding to the number of stars) and multiplied together to produce the overall song rating. This rating is incremented by 1 to ensure that the overall song rating is non-zero (this will ensure that every song on the device has some probability of being selected). An age factor is computed for each song as well, by computing the number of weeks since the song was created in the music files collection, and rounding to an integer between 1 and 5. The overall song rating and the age factor are then multiplied to produce the weighted score for the song as follows:

$$S=(R_{title}*R_{album}*R_{artist}+1)*\min(1,5-Age_{weeks}) \quad (1)$$

wherein
S is the integer weighted score in the range $1 \leq S \leq 630$;
$R_{title}$ is the user rating assigned to the song title;
$R_{album}$ is the user rating assigned to the album;
$R_{artist}$ is the user rating assigned to the artist;
$Age_{weeks}$ is the age factor in weeks;

It is appreciated that other weighted scoring schemes are possible, including other ratings or factors. For example, in an alternative implementation, the scheme includes a rating for the genre of the song ranging between 0 and 5, or a rating for any other component of the song's metadata. The scheme includes a song outcome factor ranging between 0 and 5, where a value of 0 is assigned to songs that were skipped within the first few seconds the last time they were played, a value of 5 is assigned to songs that were repeated immediately after being played, and a value of 3 is assigned to all other songs. The scheme uses numerical ranges for the rating values than are different from those described above. The scheme is based on a different mathematical formula combining rating values, an age factor, and/or a song outcome factor.

Figure 11:
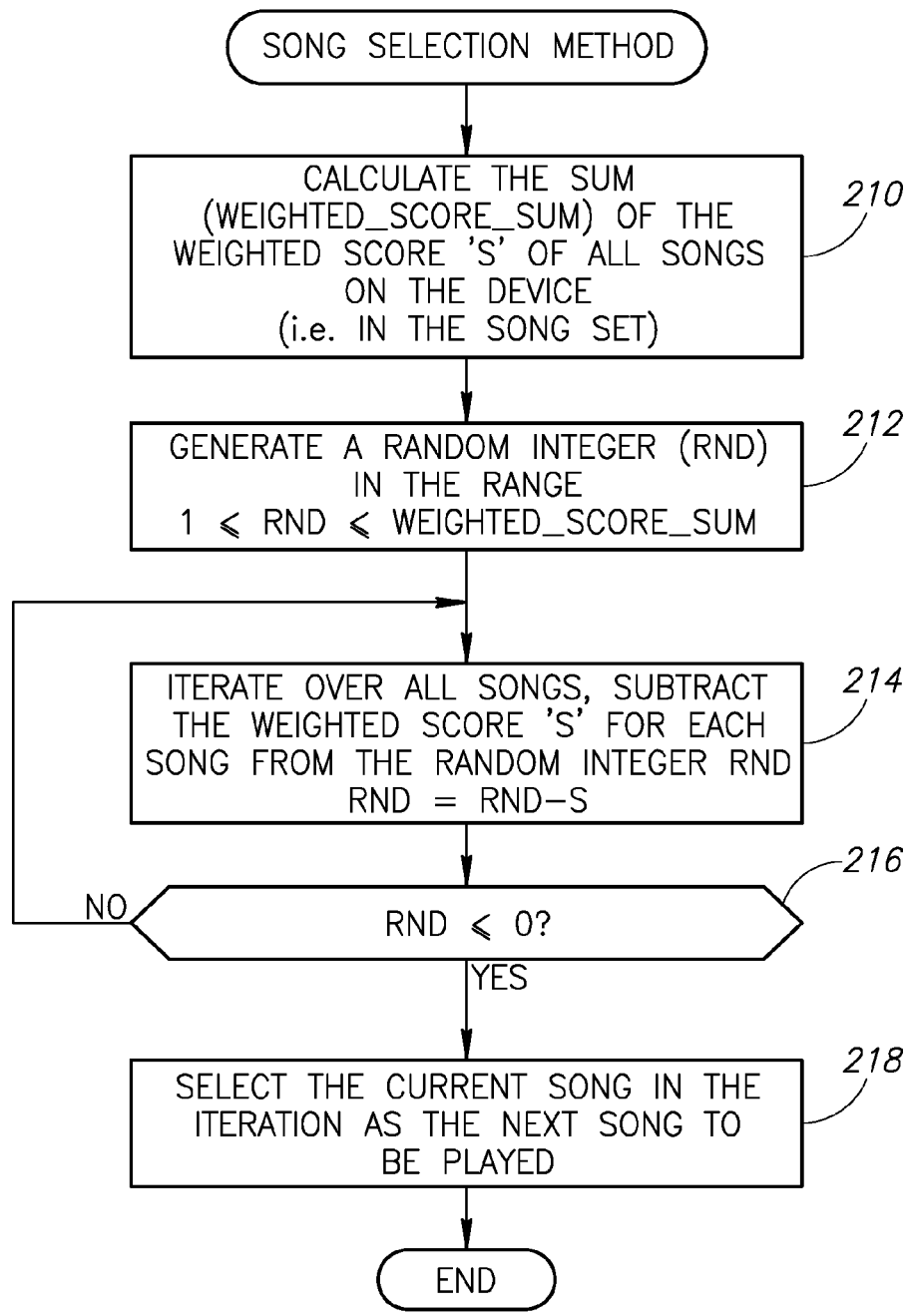
FIG. 11 is a flow diagram illustrating an example song selection method.

A flow diagram illustrating an example song selection method is shown in FIG. 11. In order to select a particular song, the device first computes the sum (WEIGHTED_SCORE_SUM) of the weighted scores for all of the songs on the device (i.e. all songs in the song set) (step 210). A random integer (RND) between 1 and this sum WEIGHTED_SCORE_SUM is generated (step 212). Iterating over the list of songs, the weighted score (S) of each song is subtracted from the random integer (RND) (step 214).

$$RND=RND-S \quad (2)$$

The weighted scores continue to be subtracted from RND until the random integer reaches or falls below zero (step 216). When this occurs, the current song in the iteration is selected as the next song to be played (step 218). It is appreciated that this process effectively biases song selection in favor of those with a high weighted score.

In one implementation, songs that have been played within a particular period of time will not be included in the algorithm to select the next song. This period of time may begin at four hours, for example, but may be configurable by the user. In any case, if there are no songs on the device that have not been played within the specified period of time, the time may be decreased and selection may be attempted again, until at least one song has not been played within the specified period of time and is therefore eligible for selection.

In other words, in this implementation, songs with higher ratings and songs that have been newly added to the music files collection, have a higher likelihood of being played more often. Thus, just like a radio station, songs that are popular (i.e. songs that listeners like and that are given a higher rating) are played more often than other songs, and songs that are new are played more often than other songs. This provides a user of the device a more radio like listening experience.

When the device connects to the music files collection, it uses a similar algorithm to decide which songs should be downloaded to the device to form the new song set. It first obtains a list of the metadata corresponding to the songs in the music files (resource) collection (e.g., title, album, artist, genre, date the song was added to the collection, etc). It then computes the weighted score for each of the songs using Equation 1 presented supra, and repeatedly applies the biased random selection algorithm described above (FIG. 11) to place the songs in a preferred order. Iterating over the songs in this order, the device determines how many songs will fit into the space available for the music files database on the device and forms the new desired song set. It then downloads any songs that are in the new song set but not in the device database, freeing up space by deleting songs from the device database that are not in the new song set.

In one implementation, songs that are on the device but that have not yet been played may be kept in the song set, i.e. so that only songs that have been played are eligible to be exchanged for new ones from the music files collection. In another implementation, songs that have not yet been played may become eligible to be exchanged if the user has changed some ratings on the device, in case, for example, a song has not yet been played but the song's artist has been assigned a low rating and the unplayed song's weighted score has decreased.

The terminology used herein is for the purpose of describing particular implementations only and is not intended to be limiting of the mechanism. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the mechanism has been presented for purposes of illustration and description, but is not intended to be exhaustive or limited to the mechanism in the form disclosed. As numerous modifications and changes will readily occur to those skilled in the art, it is intended that the mechanism not be limited to the limited number of implementations described herein. Accordingly, it will be appreciated that all suitable variations, modifications and equivalents may be resorted to, falling within the spirit and scope of the mechanism. The implementations were chosen and described in order to best explain the principles of the mechanism and the practical application, and to enable others of ordinary skill in the art to understand the mechanism for various implementations with various modifications as are suited to the particular use contemplated.

It is intended that the appended claims cover all such features and advantages of the mechanism that fall within the spirit and scope of the mechanism. As numerous modifications and changes will readily occur to those skilled in the art, it is intended that the mechanism not be limited to the limited number of implementations described herein. Accordingly, it will be appreciated that all suitable variations, modifications and equivalents may be resorted to, falling within the spirit and scope of the mechanism.

What is claimed is:

1. A method of playing music on an electronic device, the method comprising:
   randomly selecting a song to play from a music resource song set acquired via a connection to a music resource collection and based on the contents of corresponding records of a music resource rating database;
   playing back the song;
   permitting entry of user feedback during playback of the song;
   modifying a corresponding record in the music resource rating database in accordance with the feedback; and
   selecting a next song to play based on the modified contents of corresponding records of the music resource rating database,
   wherein selecting a next song to play comprises:
   calculating a sum of weighted scores of all songs in the device;
   generating a random number between one and the sum;
   iterating over all songs, subtracting each song's weighted score from the random number; and
   when the random number is less than or equal to zero, selecting the current song in the iteration as the next song to be played.

2. The method according to claim 1, further comprising tracking in the music resource rating database the outcome of each song selected for play.

3. A method of connecting an electronic device to a music resource collection, the method comprising:
   detecting current accessibility to the music resource collection;
   establishing a connection to the music resource collection;
   generating a song set to download by randomly selecting music resources from the music resource collection in accordance with one or more factors; and
   downloading the song set to the electronic device,
   wherein generating a song set to download comprises:
   obtaining a list of the metadata corresponding to the songs in the music resource collection;
   calculating a sum of weighted scores of all songs considered for downloading as a function of metadata associated therewith;
   generating a random number between one and the sum;
   iterating over all songs, subtracting each song's weighted score from the random number; and
   when the random number is less than or equal to zero, selecting the current song in the iteration as the next song to be downloaded.

4. The method according to claim 3, wherein the connection is established to the music resource collection over a Wireless Local Area Network (WLAN).

5. The method according to claim 3, wherein the connection is established to the music resource collection via a charging cradle connected to a host computer.

6. The method according to claim 3, wherein the one or more factors are selected from the group consisting of: user song ratings, user artist ratings, user album ratings, user genre ratings, song play history, user preferences and weighted scores generated for each song.

7. The method according to claim 3, wherein the music resources are selected such that over time, all songs in the music resource collection are eventually selected for downloading.

8. The method according to claim 3, further comprising generating a music resource rating database containing information associated with each available music resource within the music resource collection.

9. The method according to claim 3, wherein the method is performed on a periodic basis.

10. The method according to claim 3, wherein the method is performed on a daily basis.

11. The method according to claim 3, further comprising generating a playlist from the song set in a random fashion based on rating information associated with each song.

12. A mobile communications device, comprising:
    a communications subsystem;
    a media playback subsystem;
    a memory;
    a processor coupled to the communications subsystem, media playback subsystem and memory, the processor operative to
    establish a connection to the music resource collection via the communications subsystem;
    generate a song set to download based on a random function to select music resources from the music resource collection such that over time the entire contents of the music resource collection is selected for download;
    download the song set to the electronic device;
    select a next song to play from the song set based on a biased random function; and
    accept user supplied feedback during playback of a song which is used in calculating the biased random function,
    wherein selecting a next song to play comprises:
    calculating a sum of weighted scores of all songs in the device;
    generating a random number between one and the sum;
    iterating over all songs, subtracting each song's weighted score from the random number; and
    when the random number is less than or equal to zero, selecting the current song in the iteration as the next song to be played.

13. The mobile communications device according to claim 12, wherein the biased random function takes into account one or more user supplied ratings.

14. The mobile communications device according to claim 12, wherein the biased random function effectively provides a radio like listening experience for the user.

15. The mobile communications device according to claim 12, wherein the communications subsystem comprises a Wireless Local Area Network (WLAN) radio subsystem.

16. The mobile communications device according to claim 12, wherein the communications subsystem comprises a cellular radio subsystem.

17. The mobile communications device according to claim 12, wherein the processor is further operative to track in the music resource rating database the outcome of each song selected for play.

* * * * *